United States Patent [19]
Arn

[11] 3,838,844
[45] Oct. 1, 1974

[54] TOP ENTRY VALVE WITH ALIGNED THROUGH PASSAGE

[75] Inventor: Fred A. Arn, Rockville, Conn.

[73] Assignee: Contromatics Corporation, Rockville, Conn.

[22] Filed: Apr. 13, 1973

[21] Appl. No.: 350,699

[52] U.S. Cl. ............................ 251/174, 251/315
[51] Int. Cl. .................................. F16k 5/20
[58] Field of Search .................... 251/174, 315

[56] References Cited
UNITED STATES PATENTS
3,037,738  6/1962  Jackson ..................... 251/174 X
3,398,763  8/1968  Richards .................... 251/174 X FOREIGN PATENTS OR APPLICATIONS
403,389  12/1933  Great Britain ............... 251/174

*Primary Examiner*—Harold W. Weakley
*Attorney, Agent, or Firm*—Joseph R. Spalla

[57] ABSTRACT

Ball valves for controlling fluid flow known to the prior art have utilized biasing means to positively urge seals against the ball. The construction of some of such valves has resulted in an offset between the flow passage provided through the ball and the ports provided for connections. The invention provides annular wedge-shaped members biased transversely to the flow path to urge annular seals against the ball. The housing of the valve is provided with an opening on the uppermost portion of the housing whereby the seals may be removed from the interior of the housing together with the seal and associated seat assemblies.

3 Claims, 3 Drawing Figures

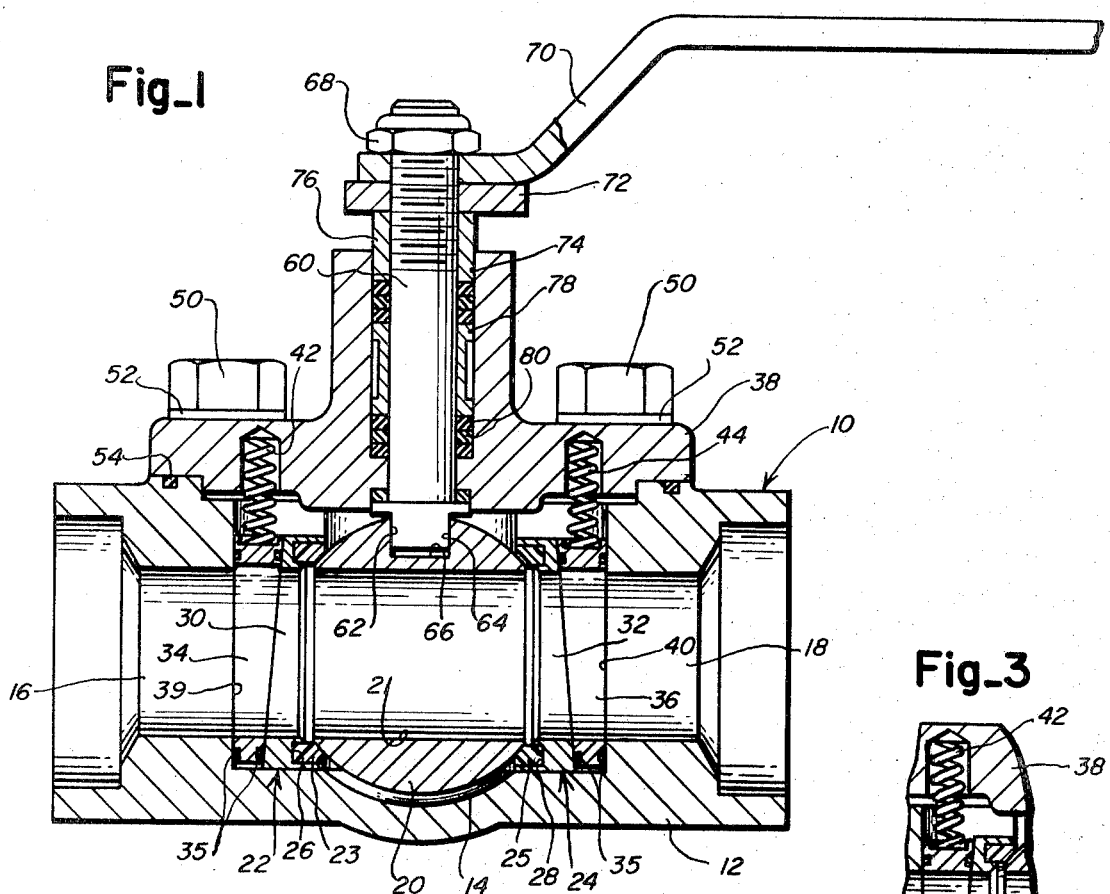
Fig_1
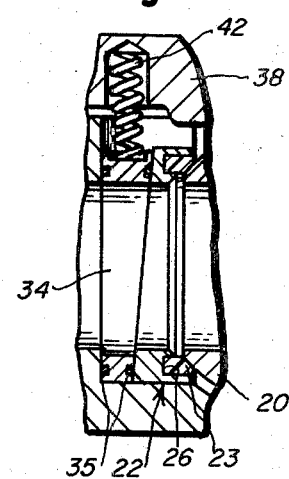
Fig_3
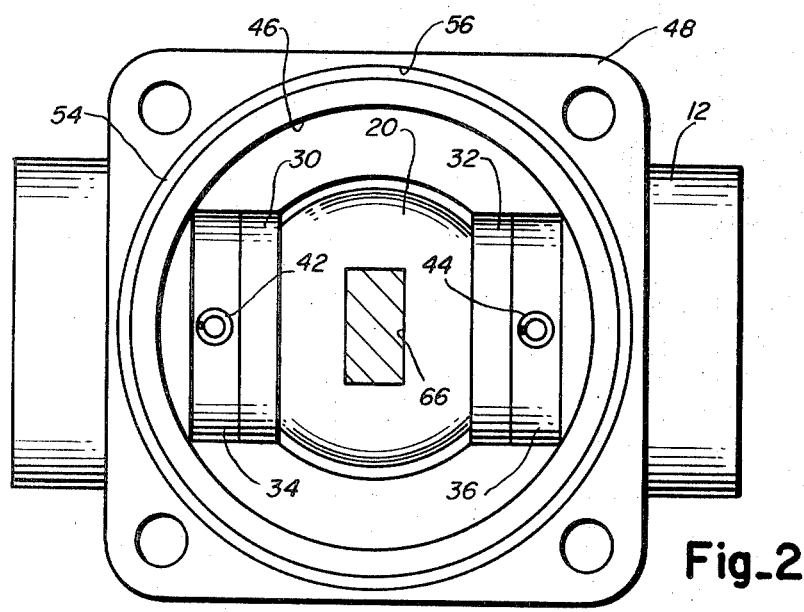
Fig_2
3,838,844

TOP ENTRY VALVE WITH ALIGNED THROUGH PASSAGE

BACKGROUND OF THE INVENTION

Ball valves are well known to the art including those having means for biasing the ball and seal assemblies together. It is desirable to provide such biasing because usage of the valve will result in wear on the seals and less positive sealing. One such valve is shown in U.S. Pat. No. 3,168,279, J. H. Anderson et al., issued Feb. 2, 1965. A problem with such valves however is that the flow path through the ball and seals is offset with respect to the passage provided at the coupling portions of the valve. It is desirable to avoid such offsets because of the resulting turbulence and pressure drops which are associated therewith. As will be apparent from inspection of such structures, wear of the seal reduces the axial dimension thereof and the spring bias urges the seal and ball in a direction transverse to the flow path causing a shift in the alignment of the various portions of the fluid conduit. The valve body has portions defining two generally planar support surfaces extending generally transversely across each interior end of each of said passages. A rotatably carried valve ball of generally spherical shape is disposed in the chamber between the passages which has a passageway therethrough having a rectilinear axis. The ball is selectively rotatable for alignment of the rectilinear axis with the passages.

A pair of annular seat and seal assemblies are disposed in the chamber with each being proximate one of the passages and defining annular sealing surface engaging opposite sides of the ball. A pair of annular wedge members are disposed between one of the generally planar support surfaces and one of the seat and seal assemblies. Biasing means is provided to urge the wedge members in a direction generally transverse to the passages, and means are provided for selectively rotating the ball between aligned and misaligned positions of the passageway thereof with respect to the passage.

In preferred embodiments of the invention the generally planar support surfaces are parallel and the seat and seal assemblies are wedge-shaped. The housing may include an opening disposed generally concentrically with respect to the axis of rotation of the ball and a bonnet may be carried on the housing and the means biasing the wedge members may be springs carried between the bonnet and the wedge members. For certain applications, it is desirable to have an opening which is larger than the width of each of the annular seat and seal assemblies. To avoid offsetting of the flow path through the ball, it is most desirable that the annular wedge member inside diameter be greater than the inside diameter of the housing passages, and preferably, also be greater than the inside diameter of the annular seat and seal assemblies as measured parallel to the direction in which the bias force is applied.

The apparatus constructed in accordance with the invention will be found to satisfy the various objects of the invention. One such object is to avoid offset of the flow conduit which results in turbulence and pressure drop.

Similarly, a further object of the invention was to provide a positive seal against the ball in the closed position before and after wear of the seals.

Still another object of the invention was to provide a valve wherein the bonnet thereof could be removed from an installed valve without causing spillage of the contents, particularly in those applications where a radioactive or corrosive substance was being conducted within the valve. More particularly, it was desirable to be able to change the seals without spillage of any of the fluid which may be in the conduit.

Still other objects, features and advantages of the present invention will become apparent to those skilled in the art from a reading of the following detailed description of a preferred embodiment, taken in conjunction with the accompanying drawing, wherein like reference numerals designate like or corresponding parts through the several views.

BRIEF DESCRIPTION OF THE DRAWING

FIG. 1 is a sectional, axial view of a ball valve in accordance with the present invention;

FIG. 2 is a top plan view of the valve of FIG. 1 with the handle and bonnet removed to best illustrate the positioning of the parts within the valve housing; and FIG. 3 is a broken-away, sectional view of a portion of the valve including one annular wedge member, one seat and seal assembly and the valve ball illustrating the alignment thereof upon axial wear of the seal.

DETAILED DESCRIPTION OF THE PREFERRED EMBODIMENT

Referring to the drawing, the ball valve 10 of the invention comprises a valve body or housing 12 defining an internal valve chamber 14 and two passages 16, 18 opening into opposite sides of the chamber in opposed alignment with each other. As shown, the outer ends of the passages 16, 18 are counterbored in a manner suitable for connection with coacting pipes or other conduits (not shown) to be connected by the valve.

A rotatable valve body 20 having a generally spherical shape is disposed in the chamber 14 between the inner ends of the passages 16, 18 as shown. A bore 21 through the ball is cylindrical and preferably of the same internal diameter as the passages 16, 18. Opposite sides of the ball valve 20 are engaged by a pair of annular seat and seal assemblies 22, 24 circling the inner ends of the respective passages 16, 18. Each seat and seal assembly comprises an annular seal 23, 25, respectively. Each of the two seals 23, 25 is held within an annular groove 26, 28 within an annular seat 30, 32. The seals 23, 25 are normally manufactured of polytetrafluoroethylene.

As shown in the drawing, provision is made for producing positive sealing engagement of the respective seals 23, 25 with the valve ball 20 throughout an extended service life of the valve while at the same time eliminating any necessity for adjusting the valve while it is in service. More specifically, wedge-shaped annular members 34, 36 are provided in sliding engagement with seats 30, 32. O-rings 35 are provided on both faces of each annular wedge member to prevent leakage around the surfaces thereof. The wedge members 34, 36 similarly slide on generally planar annular support surfaces 39, 40 provided in the valve body 12. Springs 42, 44 are held in compression between wedge members 34, 36 and a bonnet 38. The uppermost portion of the valve body 12 is provided with an opening 46 having a flange thereabout 48. The bonnet 38 engages the flange and is retained thereon by four bolts (none shown), nuts 50, 50 and washers 52, 52. An "O-ring" 54 is provided in an annular groove 56 of flange 48 to prevent leakage therebetween.

The means for rotating the ball 20 for selective alignment of the passage 21 therein with passages 16, 18 includes a generally cylindrical stepped diameter stem 60 having flats at one end thereof 62, 64 engaging a slot 66 in ball 20. The opposite end of the stem 60 is threaded for engagement by a nut 68 which secures a handle 70 together with a travel stop 72 on the stem. The operation of the travel stop 72 is well known in the art and is not necessary to the invention herein. Disposed within a counterbore 74 of the bonnet 38 is a gland ring 76, lantren ring 78 and stem seal 80. The lantren ring 78 is provided to conduct any seepage past gland ring 76. Suitable fittings (not shown) are provided to conduct any flow to the lantren ring to a readily visible location.

In operation, repetitive movement of the ball 20 between the opened and closed position results in axial wear of the seals 23, 25. Any reduction in the axial dimension of these seals is compensated for by the movement of wedge members 34, 36 which are displaced downwardly from the position shown in FIG. 1 to positively urge the seals 23, 25 against the ball 20. The relationship of the wedge members 34, 36, seat and seal assemblies 22, 24 and the ball 20 after axial wear has occurred on seals 23, 25 is best illustrated in FIG. 3. Because the inside diameter of wedge members 34, 36 measured vertically is greater than the inside diameter of the adjacent portions of passages 16, 18 and also larger than the inside diameter of the bore 21 through ball 20, the transverse movement of wedge members 34, 36 does not result in any offset of the passageway or the fluid being conducted, and, accordingly, there is no resultant pressure drop.

It will be apparent by inspection of the drawing that replacement of the seals may be readily accomplished in the event that it is necessary after substantial use. To replace the seals, it will be only necessary to remove nuts 50 and bonnet 38 to have complete access as is shown in FIG. 2 to both the wedge members 34, 36 and seat and seal assemblies 30, 32. Although the annular support surfaces 39, 40 as shown in the illustrated embodiment are parallel, it is not necessary to the invention that they be parallel. More specifically, the surfaces may be in converging planes and the obliquely disposed surfaces of the wedge members and seat and seal assemblies may be varied appropriately. Preferably, the seals 23, 25 contact with the ball 20 will define a circle which will be positioned in a plane perpendicular to the axis of the flow path. This positioning is necessary to insure the desired straight through flow. It will also be understood that the openings in the annular wedge members are most preferably greater in diameter than the associated seat and seal assemblies and passages as measured in the vertical direction as shown in the drawings. More particularly, the shape of the opening in the wedge member may be elliptical, circular or some other random shape, although it is most preferable that the minor diameter (the diameter at the minor axis) thereof be no less than the diameter of the passages and the major diameter (the diameter at the major axis) should be greater than the diameter of the passages.

It will be seen by those skilled in the art that a ball valve in accordance with the invention avoids offset of the flow path which will result in turbulence and pressure drop and similarly provides a positive seal against the ball even after wear of the seals. It will also be apparent that the valve seals may be readily changed in an installed valve without causing spillage of the contents as is particularly important in applications where radioactive or corrosive substances are being controlled.

What is claimed is:

1. A top entry ball valve comprising a valve body including a valve chamber open at the top thereof and having opposing side walls and a pair of axially aligned flow passages having a predetermined size communicating with said opposite side walls of said valve chamber, a spherical valve ball, including a flow passage having said predetermined size extending therethrough selectively located within said valve chamber, bonnet means for closing the top opening of said valve chamber and including means for displacing said valve ball from a first position whereat said ball valve passage extends substantially perpendicular to said valve body flow passages to a second position whereat said valve ball flow passage and said valve body flow passages are substantially coaxial, and means for sealing said valve ball within said valve chamber including a first annular member having a first surface including annular sealing means for engaging one side of said valve ball and a second surface opposing one of said valve chamber side walls, a second wedge-shaped annular member, intermediate said one valve chamber side wall and said first annular member, having a first surface including annular sealing means for engaging the second surface of said first annular member and a second surface including annular sealing means for engaging said one end wall of said valve chamber, first spring means for wedging said first annular member towards said one side of said valve ball, a third annular member having a first surface including annular sealing means for engaging the other side of said valve ball and a second surface opposing the other one of said valve chamber side walls, a fourth wedge-shaped annular member intermediate said other valve chamber side wall and said third annular member having a first surface including annular sealing means for engaging the second surface of said third annular member and a second surface including annular sealing means for engaging said other end wall of said valve chamber, and second spring means for wedging said first annular member towards said other side of said valve ball.

2. A top entry ball valve according to claim 1, wherein said valve chamber side walls are substantially parallel.

3. A top entry ball valve according to claim 2, wherein said second surface of each of said first and third annular members and said first surface of each of said second and fourth wedge-shaped annular members are selectively inclined.

* * * * *